US005207730A

United States Patent [19]

Ruggiero

[11] Patent Number: 5,207,730

[45] Date of Patent: May 4, 1993

[54] EXPANSION TUBE PULLER

[76] Inventor: Joseph Ruggiero, 509 E. Broadway, Port Jefferson, N.Y. 11777

[21] Appl. No.: 923,594

[22] Filed: Aug. 3, 1992

[51] Int. Cl.[5] .............................................. B23P 19/04

[52] U.S. Cl. .............................................. 29/255

[58] Field of Search .................. 294/104, 106; 29/254, 29/255, 267, 268, 262, 263, 275

[56] References Cited

U.S. PATENT DOCUMENTS

| | | | |
|---|---|---|---|
| 191,026 | 5/1877 | Caldwell | 29/268 |
| 1,519,938 | 12/1924 | Smith | 294/104 |
| 1,580,578 | 4/1926 | Berry | 294/104 |
| 1,616,121 | 2/1927 | Gruber | 294/104 |
| 2,779,089 | 1/1957 | Allen | 29/254 |
| 3,739,452 | 6/1973 | Gadberry | 29/254 |
| 3,791,012 | 2/1974 | Jenkin | 29/254 |
| 4,307,635 | 12/1981 | Genova | 29/254 |
| 4,335,493 | 6/1982 | Shivers et al. | 29/254 |

*Primary Examiner*—Robert C. Watson

*Attorney, Agent, or Firm*—Bernard J. Murphy

[57] ABSTRACT

A pair of pivotably-joined jaws have a clamp, coupled thereto, for setting the jaws in a selected angular position therebetween and for preventing a pivotable widening thereof after the angle has been set. Too, one of the jaws has an anvil extending therefrom, and a slide hammer assembly, coupled to the anvil, causes percussive jarring of the jaws, in order to free up a stuck expansion tube from an evaporator line. Recesses formed adjacent terminal ends of the jaws engage ears of the expansion tube to enhance the grip thereon.

4 Claims, 2 Drawing Sheets

EXPANSION TUBE PULLER

This invention pertains to expansion tube pullers, for use in servicing air conditioning and refrigeration systems, and in particular to an improved expansion tube puller having means for percussively assisting operation thereof.

Air conditioning and refrigeration mechanics and service personnel appreciate how difficult it is to remove the expansion tube, in the evaporator line of air conditioning and/or refrigeration systems. Particulate matter collects in the area of the expansion tube fine screen and, effectively, seizes the expansion tube, making its replacement a frustrating chore.

Removal tools known in the prior art are not adequate to the chore. Commonly they fracture the expansion tube, leaving portions thereof in the evaporator line. The follow-on endeavors to extract the broken pieces causes the evaporator line to be damaged.

There has long been a need for an efficient, novel, expansion tube puller which will extract the whole expansion tube, with relative ease, without fracturing the latter, while insuring against damage to the evaporator line itself.

It is an object of this invention to set forth Just such a long sought, improved, expansion tube puller.

Particularly, it is an object of this invention to disclose an expansion tube pouller comprising a pair of pivotably-joined jaws; and means, coupled to at least one of said jaws, for percussively jarring said jaws.

Further objects of this invention, as well as the novel features thereof, will be apparent by reference to the following description, taken in conjunction with the accompanying figures, in which.

Figure 1:
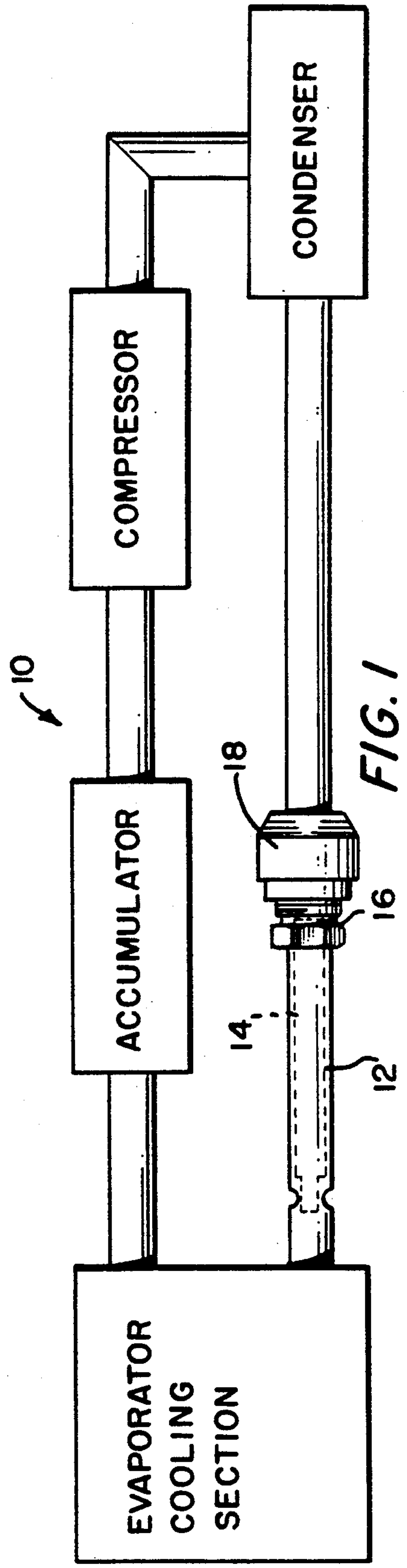
FIG. 1 is a block diagram of a basic cooling system (i.e., for air conditioning or refrigeration), the same showing the location of an expansion tube in an evaporator line.
Figure 2:
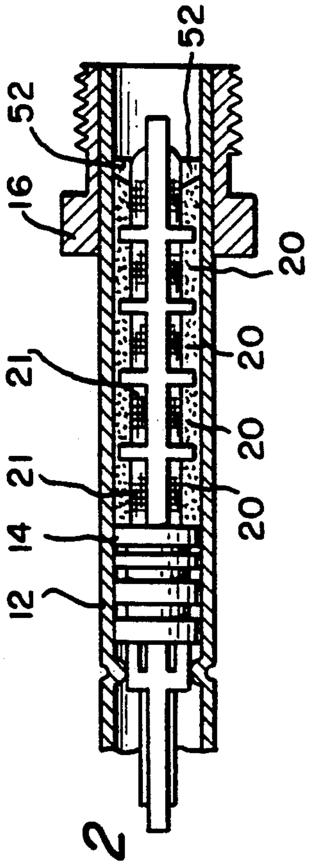
FIG. 2 depicts, in axial cross-section, a typical expansion tube in a portion of an evaporator line.
Figure 5:
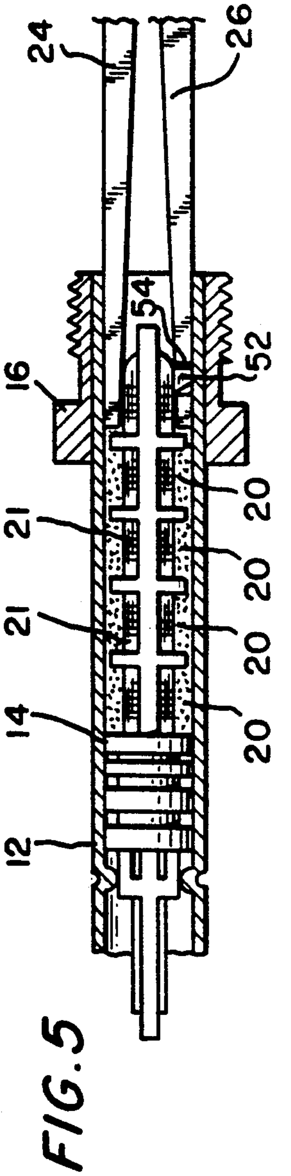
FIG. 5 is a depiction of an expansion tube puller, the same as that in FIG. 2, showing the working ends of the novel tube puller engaged with the ears of the expansion tube.

As shown in FIG. 1, the cooling system 10, comprising an evaporator cooling section, accumulator, compressor and condenser, has an evaporator line 12 in which an expansion tube 14 is confined. The expansion tube 14 is shown in FIG. 2, together with a portion of the line 12 and the jam nut 16 which secures the line 12 to a coupling 18 (FIG. 1).

Commonly, over use, particulate matter 20 accretes on the screen 21 of the tube 14, and fills in the space between the tube 14 and the line 12. Then, when it is necessary to replace the tube 14, the accreted and collected matter 20 effectively blocks the tube removal. In a word, the particulate matter 20 locks the tube 14 in the line 12. If a puller tool is simply clamped onto the tube 14 and pulled, invariably the tube 14 fractures, and a residual portion of the tube 14 remains in the line 12. Poking and probing with picks, screwdrivers, and the like, to extract the residue of the tube 14 results in damage to the line 12.

Figure 3:
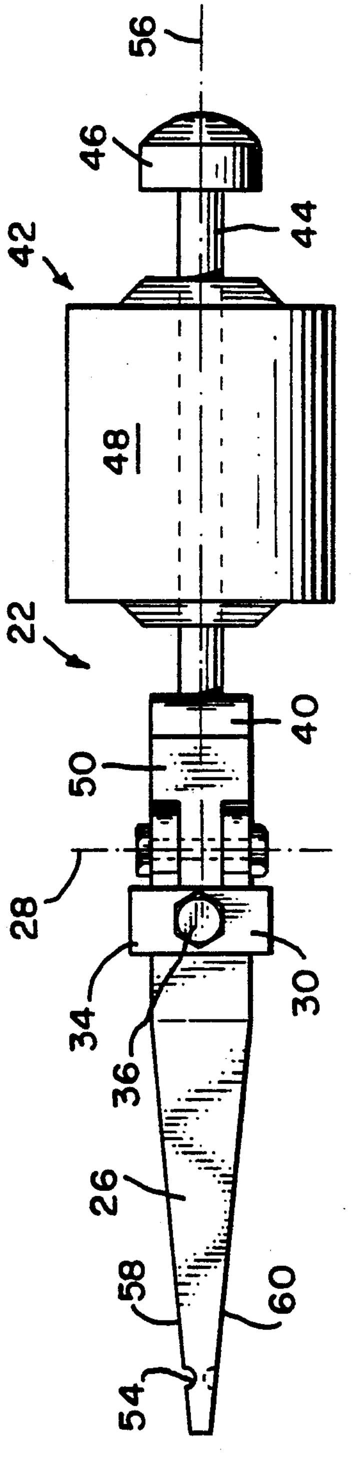
FIG. 3 is a top or plan view of the novel expansion tube puller, according to an embodiment thereof.
Figure 4:
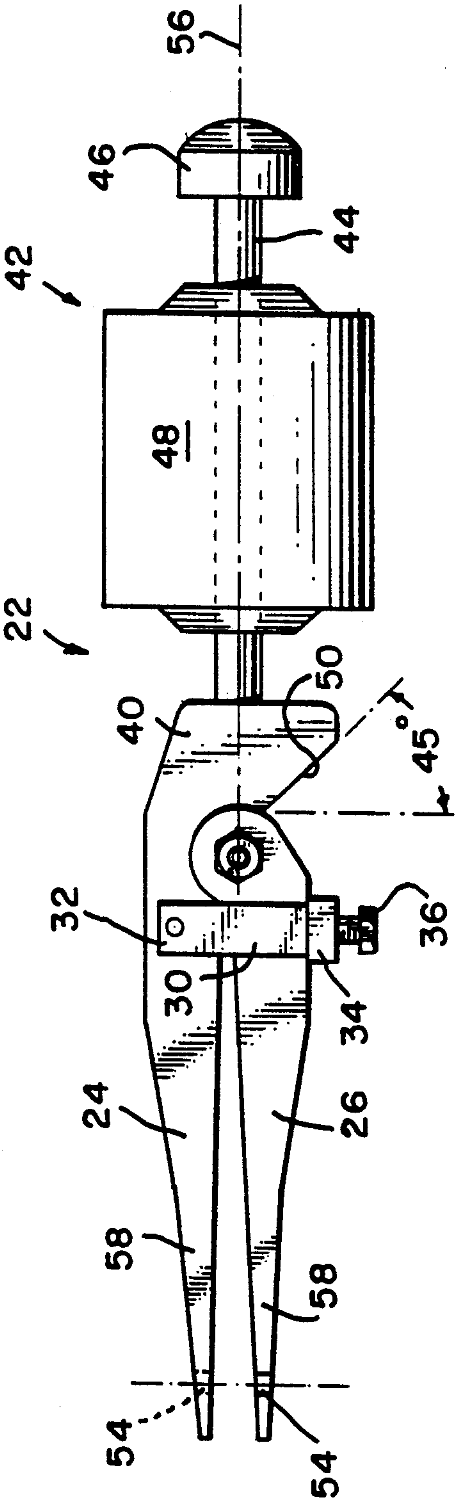
FIG. 4 is a side view of the puller of FIG. 3, the same taken from the top of FIG. 3.

The novel puller 22, shown in FIGS. 3 and 4, comprises a pair of pivotably-joined jaws 24 and 26, having a pivot axis 28. A clamp 30, having a pair of parallel legs 32 (only one of which is shown), and a transverse limb 34, is provided to adjustably set the jaws in a selected, angular disposition therebetween, and to prevent a widening of the Jaws 24 and 26 beyond the selected setting. The legs 32 are pinned to jaw 24, and the limb 34 surmounts jaw 26. In addition, limb 34 has an adjustment screw 36 engaged therewith, and the leading end of the screw is directed for forceful engagement thereof with the jaw 26.

Jaw 24 has an anvil 40 integral therewith, and a hammer assembly 42 is fixed thereto. The assembly 42 comprises a rod 44 extending outwardly from the anvil 40, and the outermost end of the rod 44 has a limit stop cap nut 46 fixed thereto. A centrally-bored hammer 48 is slidably engaged with the rod 44.

In use, the jaws 24 and 26 are spread apart sufficiently to enter the line 12 and to have the leading, working ends of the jaws engage the tube 14. The screw 36 is torqued firmly against the jaw 26, to hold the jaw ends in clasp of the tube 14. Then, to break the tube 14 free of the accreted matter 20, the hammer 48 is slid back and forth on the rod 44, for impacting engagement thereof with the anvil 40 and the limit stop nut 46. Promptly, the tube frees itself of the accreted matter 20, and can be extracted from the line 12, due to the jarring thereof by the hammer assembly 42.

The anvil 40 has a diagonal land 50 which, in lieu of use of the hammer assembly 42, can be impacted by a separate air hammer (not shown) to jar the tube 14 free of the line 12. The cyclic vibration of the tube 14, by the air hammer, will draw the tube 14 right out of the line 12.

Most commonly, expansion tubes have ears 52 (FIG. 2) which offer themselves as means for latching of the working ends of the jaws 24 and 26 thereto. To this end, the jaws 24 and 26 have, in near adjacency to the very ends thereof, shallow recesses 54 provided for engaging such ears 52. The ends, or terminations of the jaws 24 and 26, as illustrated, are progressively narrowed outwardly thereof, to insure that the same can enter the line 12. The jaw terminations have first and second opposite sides 58 and 60, respectively. The termination of one jaw 26 has its recess 54 formed in only side 58, whereas the termination of the other jaw 24 has its recess 54 formed in only side 60 thereof. The working ends of the jaws 24 and 26 are entered into the line 12 until the recesses 54 align with the ears 52. Then the puller 22 is rotated ninety degrees, to cause the recesses 54 to encompass the ears 52. At this time the hammer assembly is worked, or the cited air hammer is applied to the land 50. The puller 22 is efficiently designed; the longitudinal axis 56 of the rod 44 is normal to, and bisects, the pivot axis 28, to insure that the impacting, percussive blows will be effectively visited upon both jaws 24 and 26.

While I have described my invention in connection with a specific embodiment thereof, it is to be clearly understood that this is done only by way of example, and not as a limitation to the scope of the invention, as set forth in the objects thereof and in the appended claims.

I claim:

1. An expansion tube puller, comprising:

a pair of pivotably-joined jaws; and means, coupled to at least one of said jaws, for percussively jarring said jaws; wherein said one jaw has an anvil extending therefrom;

said jarring means comprises a hammer assembly joined to said anvil;

said jaws have outermost terminations progressively narrowed outwardly thereof;

said terminations have first and second opposite sides;

said termination of one of said jaws, of said pair thereof, has only a single recess formed therein;

said termination of the other of said jaws, of said pair thereof, has only a single recess formed therein;

said recess in said termination of said one jaw is formed in only said first side thereof;

said recess in said termination of said other jaw is formed in only said second side thereof;

said hammer assembly comprises (a) a rod projecting outwardly from said anvil, (b) a centrally-bore hammer slidably disposed on said rod, and (c) a limit stop fixed to an outermost termination of said rod;

said rod has a longitudinal axis; and said anvil has an impactable land, formed thereon, which lies in a plane diagonal to said axis of said rod.

2. An expansion tube puller, according to claim 1, further including:

clamping means, fixed to one of said jaws, and straddling at least a portion of the other of said jaws, for (a) adjustably setting said jaws in a selected angular disposition therebetween, and (b) preventing a pivotable widening of said jaws beyond said disposition.

3. An expansion tube puller, according to claim 2, wherein:

said clamping means comprises a clamp having (a) parallel legs, (b) a transverse limb, and (c) an adjustment screw in threaded penetration of said limb; and said legs are pinned to said one jaw, said limb surmounts the other of said jaws, and said screw has a leading end for forceably engaging said other jaw.

4. An expansion tube puller, according to claim 1, wherein: said recesses are aligned along a given plane.

* * * * *